US010782968B2

(12) United States Patent
Figuli et al.

(10) Patent No.: US 10,782,968 B2
(45) Date of Patent: Sep. 22, 2020

(54) RAPID SUBSTRING DETECTION WITHIN A DATA ELEMENT STRING

(71) Applicant: International Business Machines Corporation, Armonk, NY (US)

(72) Inventors: Razvan Peter Figuli, Remchingen (DE); Stefan Payer, Stuttgart (DE); Cedric Lichtenau, Stuttgart (DE); Kerstin C. Schelm, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 16/109,836

(22) Filed: Aug. 23, 2018

(65) Prior Publication Data

US 2020/0065096 A1 Feb. 27, 2020

(51) Int. Cl.
*G06F 16/2458* (2019.01)
*G06F 16/22* (2019.01)
*G06F 9/30* (2018.01)
*G06F 16/903* (2019.01)

(52) U.S. Cl.
CPC ...... *G06F 9/30029* (2013.01); *G06F 9/30018* (2013.01); *G06F 9/30036* (2013.01); *G06F 16/90344* (2019.01)

(58) Field of Classification Search
None
See application file for complete search history.

(56) References Cited

U.S. PATENT DOCUMENTS

| 4,094,001 | A |   | 6/1978 | Miller |
| 4,907,194 | A | * | 3/1990 | Yamada ............ G06F 16/90344 365/49.17 |
| 4,955,056 | A |   | 9/1990 | Stentiford |
| 5,757,983 | A |   | 5/1998 | Kawaguchi et al. |
| 6,738,794 | B2 |  | 5/2004 | Stein et al. |

(Continued)

FOREIGN PATENT DOCUMENTS

| CN | 101609455 A | 12/2009 |
| EP | 2680166 B1 | 10/2015 |
| WO | 2007076269 A2 | 7/2007 |

OTHER PUBLICATIONS

Sitaridi et al., "SIMD-Accelerated Regular Expression Matching", DaMoN '16, Jun. 26, 2016, ACM, pp. 1-7.

(Continued)

*Primary Examiner* — Hyun Nam
(74) *Attorney, Agent, or Firm* — Nathan M. Rau (57) ABSTRACT

A substring can be detected within a string of data elements through a method that includes partitioning and distributing the string of data elements to an ordered list of segments having equal lengths greater than or equal to the length of the substring. A substring match within a segment of the ordered list of segments can be detected by sequentially comparing the substring with each segment of the ordered list of segments. A carry vector that includes the substring match can be created, in response to detecting the substring match that is a partial match. It can be determined that a carry vector exists by comparing the substring with the segment of the ordered list of segments, and it can be subsequently determined that a full match exists between the carry vector and the segment of the ordered list of segments.

20 Claims, 6 Drawing Sheets

(56) References Cited

U.S. PATENT DOCUMENTS

| | | | |
|---|---|---|---|
| 7,444,326 | B1 | 10/2008 | Jagadish et al. |
| 7,596,553 | B2 | 9/2009 | Meirovitz et al. |
| 7,756,847 | B2 | 7/2010 | Pauws et al. |
| 7,872,890 | B1 | 1/2011 | Starovoytov |
| 7,991,987 | B2 | 8/2011 | Cabot |
| 8,051,085 | B1 | 11/2011 | Srinivasan et al. |
| 8,296,279 | B1 | 10/2012 | Singh |
| 8,407,245 | B2 | 3/2013 | Ryan et al. |
| 8,620,968 | B2 | 12/2013 | Atasu et al. |
| 9,424,031 | B2 | 8/2016 | Thantry et al. |
| 9,460,196 | B2 | 10/2016 | Boyce |
| 10,063,474 | B2 | 8/2018 | McGhee et al. |
| 10,169,451 | B1 | 1/2019 | Payer et al. |
| 2003/0137437 | A1* | 7/2003 | Watson .......... H03M 7/40 341/63 |
| 2004/0010752 | A1* | 1/2004 | Chan .......... G06F 16/80 715/234 |
| 2007/0011734 | A1* | 1/2007 | Balakrishnan ........ H04L 43/026 726/13 |
| 2007/0133593 | A1 | 6/2007 | Shankara |
| 2008/0040345 | A1 | 2/2008 | Cameron |
| 2008/0050469 | A1 | 2/2008 | Kwon et al. |
| 2008/0208850 | A1* | 8/2008 | Boyce .......... G06F 16/2458 |
| 2010/0142813 | A1* | 6/2010 | Abdo .......... H04N 1/646 382/166 |
| 2010/0225506 | A1* | 9/2010 | Chen .......... H03M 7/3086 341/51 |
| 2011/0252046 | A1 | 10/2011 | Szabo et al. |
| 2013/0086096 | A1 | 4/2013 | Indeck et al. |
| 2014/0095834 | A1 | 4/2014 | Kuo |
| 2014/0189320 | A1 | 7/2014 | Kuo |
| 2015/0199178 | A1 | 7/2015 | Shi et al. |
| 2015/0347532 | A1 | 12/2015 | Shaw et al. |
| 2016/0224552 | A1 | 8/2016 | Han et al. |
| 2017/0011120 | A1 | 1/2017 | Cheung et al. |
| 2017/0024439 | A1 | 1/2017 | Chavan et al. |
| 2017/0077964 | A1 | 3/2017 | Guilford et al. |
| 2017/0185465 | A1 | 6/2017 | Ould-Ahmed-Vall et al. |
| 2018/0217836 | A1 | 8/2018 | Johnson |
| 2018/0314722 | A1* | 11/2018 | Li .......... G06F 16/81 |
| 2019/0325083 | A1* | 10/2019 | Payer .......... G06F 16/9038 |

OTHER PUBLICATIONS

Figuli et al., "Plausability-Driven Fault Detection in String Termination Logic for Fast Exact Substring Match", U.S. Appl. No. 16/567356, filed Sep. 11, 2019.
Figuli et al., "Plausability-Driven Fault Detection in Result Logic and Condition Codes for East Exact Substring Match", U.S. Appl. No. 16/567398, filed Sep. 11, 2019.
List of IBM Patents or Patent Application Treated as Related, Signed Apr. 17, 2020, 2 pages.

Karp et al., "Efficient randomized pattern-matching algorithms", IBM Journal Res. Develop., vol. 31, No. 2, Mar. 1987, pp. 249-260.
Boyer et al., "A Fast String Searching Algorithm", Communications of the ACM, Oct. 1977, vol. 20, No. 10, pp. 762-772.
Knuth et al., "Fast Pattern Matching in Strings", SIAM J. Comput., vol. 6, No. 2, Jun. 1977, 28 pages.
Intel, "Intel® SSE4 Programming Reference", Reference No. D91561-003, Jul. 2007, 197 pages.
Intel, "Intel® 64 and IA-32 Architectures Optimization Reference Manual", Order No. 248966-033, Jun. 2016, 672 pages.
Franek et al., "A simple fast hybrid pattern-matching algorithm", Journal of Discrete Algorithms 5 (2007), Available online Jan. 16, 2007, pp. 682-695.
Indyk, P., "Faster algorithms for string matching problems: matching the convolution bound", 39th Annual Symposium on Foundations of Computer Science, Nov. 8-11, 1998, 8 pages.
Abdeen, R., "Start-to-End Algorithm for String Searching", IJCSNS International Journal of Computer Science and Network Security, vol. 11 No. 2, Feb. 2011, pp. 179-182.
Unknown, "charmatch: Partial String Matching", Sep. 22, 2017, 26 pages.
Uknown, "Java String indexOf Parsing", CodingBat code practice, Code Help and Videos, Sep. 22, 2017, 3 pages.
Lau, K., "Swift Algorithm Club: Boyer Moore String Search Algorithm", raywenderlich.com, Jun. 30, 2017, 8 pages.
Mula, W., "SIMD-friendly algorithms for substring searching", Nov. 28, 2016, Updated on Apr. 29, 2017, 16 pages.
Faro et al., "Fast Packed String Matching for Short Patterns", 2013 Proceedings of the Fifteenth Workshop on Algorithm Engineering and Experiments, pp. 113-121.
Myers, G., "A Fast Bit-Vector Algorithm for Approximate String Matching Based on Dynamic Programming", Journal of the ACM, vol. 46, No. 3, May 1999, pp. 395-415.
Unknown, "Count Occurrences of a Substring", rosettacode.org, last modified Jan. 14, 2018, printed Mar. 8, 2018, 60 pages, https://www.rosettacode.org/wiki/Count_occurrences_of_a_substring.
Lin et al., "Non-Overlapping Subsequence Matching of Stream Synopses", IEEE Transactions on Knowledge and Data Engineering, vol. 30, No. 1, Jan. 2018, pp. 101-114.
Zhikai et al., "Fast String Matching With Overlapped Substring Classifier in Deep Packet Inspection Systems", 2010 IEEE Global Telecommunications Conference, Dec. 6-10, 2010, 6 pages.
Figuli et al., "Non-Overlapping Substring Detection Within a Data Element String", U.S. Appl. No. 16/109,840, filed Aug. 23, 2018.
Payer et al., "Rapid Character Substring Searching", U.S. Appl. No. 15/957,984, filed Apr. 20, 2018.
Payer et al., "Rapid Partial Substring Matching", U.S. Appl. No. 15/957,989, filed Apr. 20, 2018.
IBM, List of IBM Patents or Patent Applications Treated as Related, Aug. 20, 2018, 2 pages.

* cited by examiner

RAPID SUBSTRING DETECTION WITHIN A DATA ELEMENT STRING

BACKGROUND

The present disclosure relates to the field of digital computer systems, and more specifically, to a method, logic device, and computer program product for rapid substring detection within a data element string.

Digitally represented text is often stored within a data storage device as strings of binary-encoded characters. Examples of widely accepted and used character encoding standards for electronically stored text include the American Standard Code for Information Interchange (ASCII) and the Unicode Transformation Format (UTF). Various versions and derivatives of these standards can include a range of bits per character between 7 and 32. A common text processing task performed by computers is a substring search or substring match that is used to identify occurrences of a "reference" string of characters within a larger "target" string of characters. There is an ever-increasing pool of digitally stored textual information, particularly non-structured human-readable information, available for use with computers and other electronic devices. In order to efficiently and effectively process this pool of digitally stored textual information there is a need for more rapid location and matching of information such as character substrings from within larger strings of binary-encoded characters.

SUMMARY

Embodiments may be directed towards a method, a logic device, and a computer program product for rapid detection of a substring within a data element string. Embodiments of the present disclosure can be freely combined with each other if they are not mutually exclusive.

Embodiments may be directed towards a method for detecting a substring within a string of data elements. The method can include partitioning and distributing the string of data elements to an ordered list of segments having equal lengths. The equal lengths can be at least equal to a length of the substring. The method can also include detecting, by sequentially comparing the substring with each segment of the ordered list of segments, a substring match within a segment of the ordered list of segments. The method can also include creating, in response to detecting the substring match that is a partial match, a carry vector that includes the substring match and determining, when comparing the substring with the segment of the ordered list of segments, that a carry vector exists. The method can also include determining, in response to the carry vector existing, that a full match exists between the carry vector and the segment of the ordered list of segments.

Embodiments may also be directed towards a logic device for detecting a substring within a string of data elements. The logic device can include a comparator matrix including diagonal AND chains configured to detect a substring match and correction logic configured to suppress a partial match. The logic device can also include a substring input register configured to receive and contain the substring and a string input register configured to receive and contain the string of data elements. The logic device can also include a first bitmask output register configured to receive and contain a first result bitmask and a second bitmask output register configured to receive and contain a second result bitmask. The logic device can also include a third bitmask output register configured to receive and contain a third result bitmask and a carry vector input/output register configured to receive and contain a carry vector. The logic device can be configured to partition and distribute the string of data elements, contained within the string input register, to an ordered list of segments having equal lengths that are at least equal to a length of the substring. The logic device can also be configured to detect, by sequentially comparing the substring, contained in the substring input register, with each segment of the ordered list of segments, a substring match within a segment of the ordered list of segments. The logic device can also be configured to create, in response to detecting the substring match that is a partial match, a carry vector, contained in the carry vector input/output register, that includes the substring match. The logic device can also be configured to determine, when comparing the substring, contained in the substring input register, with the segment of the ordered list of segments, that a carry vector exists. The logic device can also be configured to determine, in response to the carry vector existing, that a full match exists between the carry vector, contained in the carry vector input/output register, and the segment of the ordered list of segments.

Embodiments may also be directed towards a computer program product for detecting a substring within a string of data elements. The computer program product includes a non-transitory computer-readable storage medium having program instructions embodied therewith. The program instructions are executable by a computer to cause the computer to perform a method. The method includes partitioning and distributing the string of data elements to an ordered list of segments having equal lengths that are at least equal to a length of the substring and detecting, by sequentially comparing the substring with each segment of the ordered list of segments, a substring match within a segment of the ordered list of segments. The method also includes creating, in response to detecting the sub string match that is a partial match, a carry vector that includes the substring match. The method also includes determining, when comparing the substring with the segment of the ordered list of segments, that a carry vector exists. The method also includes determining, in response to the carry vector existing, that a full match exists between the carry vector and the segment of the ordered list of segments.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

The descriptions of embodiments of the present disclosure will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand.

Embodiments of the present disclosure generally relate to data processing systems, and in particular, to a method, a logic device and a computer program product for detecting substrings within a string of data elements.

Some embodiments can include a method for detecting substrings within a string of data elements. The string is partitioned and distributed to an ordered list of segments of equal length that is greater or equal to the length of the substring. The length of the substring or string can be understood to be equal to the number of data elements. The data elements can, for example, be bits or characters. The substring is then compared sequentially with each segment in the order of the list to detect a match within the segment. When no match is found then a number of "zero" matches is returned. In such a comparison, the individual elements in a segment are compared concurrently by the vector engine.

The embodiments described herein can include the use of particular technologies only by way of example, for ease of understanding of the description. Embodiments can be useful for detecting a partial match or a full match between the substring and a segment, in response to detecting a partial match, creating a carry vector by including the partial match of the substring and, when comparing the substring with a segment, determining if a carry vector exists. If a carry vector exists, then embodiments can determine if a full match between the carry vector and the segment exists. When no match is found then a number zero matches is returned.

Substring search algorithms that are implemented in software and that use a character-by-character comparison method, such as a "naïve" algorithm, can be accelerated through the use of Single Instruction Multiple Data (SIMD) vector hardware. According to embodiments, vector or SIMD hardware can implement, through special-purpose hardware functions, dedicated string search/detection instructions. Such dedicated string detection can be useful in simultaneously comparing several characters of a string, represented as a vector, through the use a single operation. The use of such special-purpose hardware functions and instructions can result in significant acceleration of substring searches. In the case of long target strings that are split in several register-wide segments, certain types of searches can require some kind of "retrace" when a potential substring crosses the end of a string, i.e., instead of continuing the search with the next segment, the pointer is shifted such that the next segment starts within the current segment with a certain overlap. Conditional retrace can not only slow down the overall movement in the case of partial matches, but can also require additional operations and conditional branches. A significant problem with conditional branches in the program flow is that the processor pipeline may need to be flushed in the event that the branch prediction misses, which can cause additional processing delays. A method according to embodiments can allow continuous stream searching through a text in an equivalent segment width, without requiring rearrangement of the text after a partial match.

According to embodiments, the method for a substring vector engine uses carry logic to avoid the necessity to retrace when a potential substring straddles two segments. This technique can result in a faster forward movement than certain other types of substring searches. Software implementation can further exploit this search engine to not only move faster forward but also to minimize conditional branches. The occurrence of fewer conditional branches can lead to fewer badly predicted branches, which can reduce pipeline flushes, thus increasing overall searching performance.

The method works in conjunction with a comparator matrix including diagonal AND chains and correction logic used for suppressing partial matches from the main result. This logic structure is able to detect a full substring in short target strings within a vector size in only one comparison cycle.

Embodiments can be useful for improving the performance of substring searches within long target strings that are longer than a particular vector size and that need to be split into several segments. To avoid retracing in substring searching within long target strings, a hardware vector arithmetic can be used with carry-in and carry-out logic of partial substrings. As used herein, the term "iteration" can refer to a substring search within one segment of a string. The carry is a history of the previous compare, and allows the continuation of the new iteration from an ending point of the last iteration. It can be viewed as an extension of the AND chains into the next iteration. This logical/hardware structure can be useful in providing for only forward movement of segments, at the speed of full vector lengths per cycle.

Embodiments may be useful in accelerating substring searches within long target strings by employing a hardware vector engine that exploits parallelism in a SIMD fashion. Compared to other substring search techniques, the hardware vector engine described herein can eliminate the need for retrace, and thus it can provide significantly faster substring searching capability.

The present disclosure builds upon the logic structure for fast ordered comparison, as described by the following equations:

$$s_j = e(0)(j) \wedge \prod_{i=1}^{M-1-j} e(i)(i+j) \vee \text{zero}(i)$$

$$r_j = s_j \wedge cm_j$$

with $$e(i)(j) = \begin{cases} 1, & \text{for } a(i) = b(j) \\ 0, & \text{for } a(i) \neq b(j) \end{cases}$$

and $$\text{zero}(i) = \begin{cases} 1, & \text{for } a(i) = 0x00(hex) \\ 0, & \text{for } a(i) \neq 0x00(hex) \end{cases}$$

Therein, "a" and "b" are vectors of characters, i.e., strings of data elements, representing the substring and the string respectively. "M" is the size in character counts of the a and b vectors, the bit-vector "S" is an intermediate anticipated substring match result for the current segment, and "cm" is a correction mask suppressing partial matches and the bit-vector "r" is the exact result of full matches for the current segment. [emphasis added]

Figure 1:
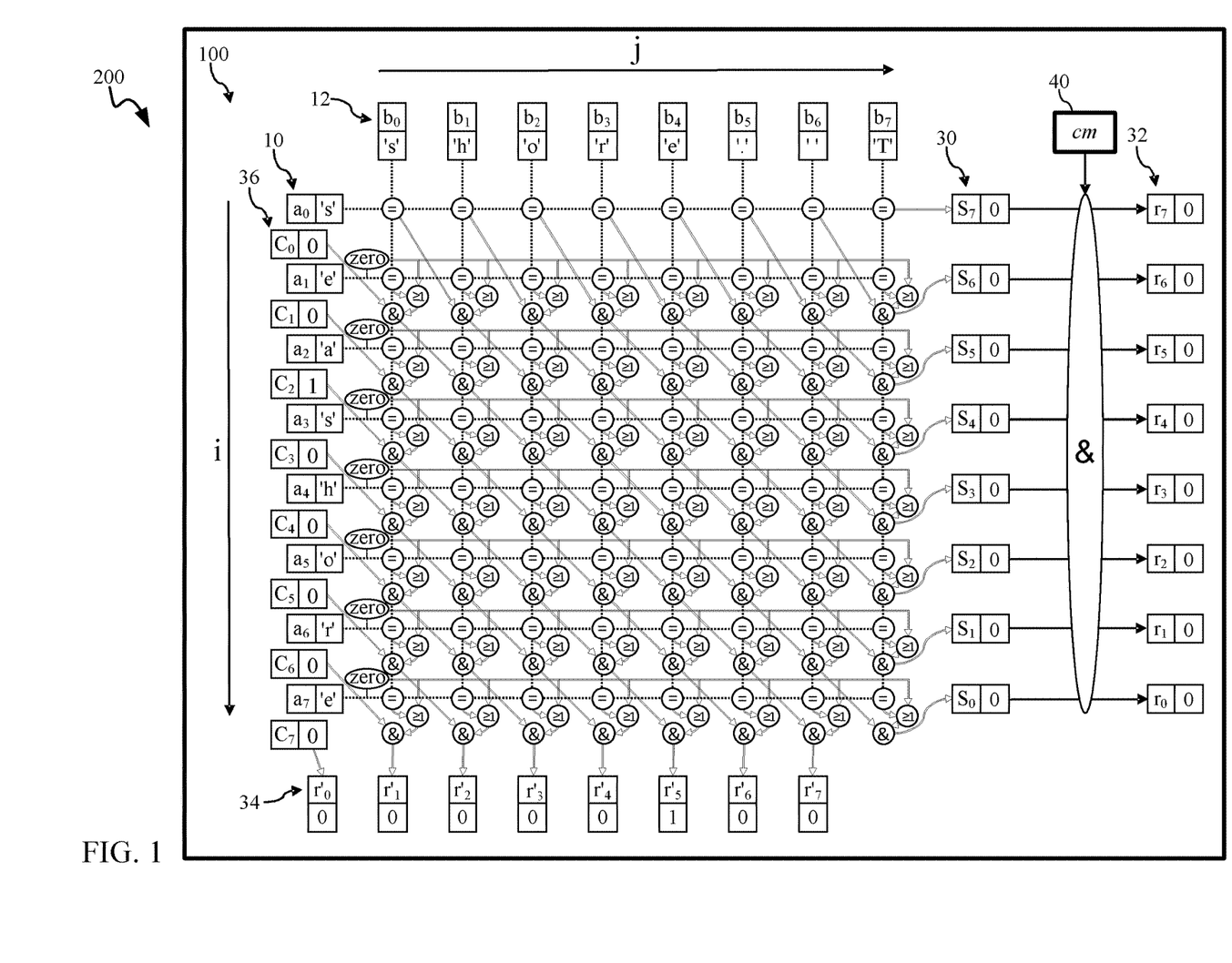
FIG. 1 is a block diagram that depicts a comparator matrix including diagonal AND chains for substring matching, according to embodiments of the present disclosure.

FIG. 1 depicts a comparator matrix 100 with diagonal AND chains for substring match, with correction logic 40 to suppress partial matches. FIG. 1 also includes a substring match extension comprising a carry vector 36 and an additional result vector 34 for matches that start in a previous segment, according to embodiments of the present disclosure. The vectors a and b represent the substring 10 and the string 12, respectively, in a segment length. The bit-vector S is represented by the first result bitmask 30 and the bit-vector r is represented by the second result bitmask 32. The additional result vector r' is represented by the third result bitmask 34. The anticipated intermediate result is represented by the carry vector C 36. The correction logic 40 corresponds to the correction mask cm.

Figure 2:
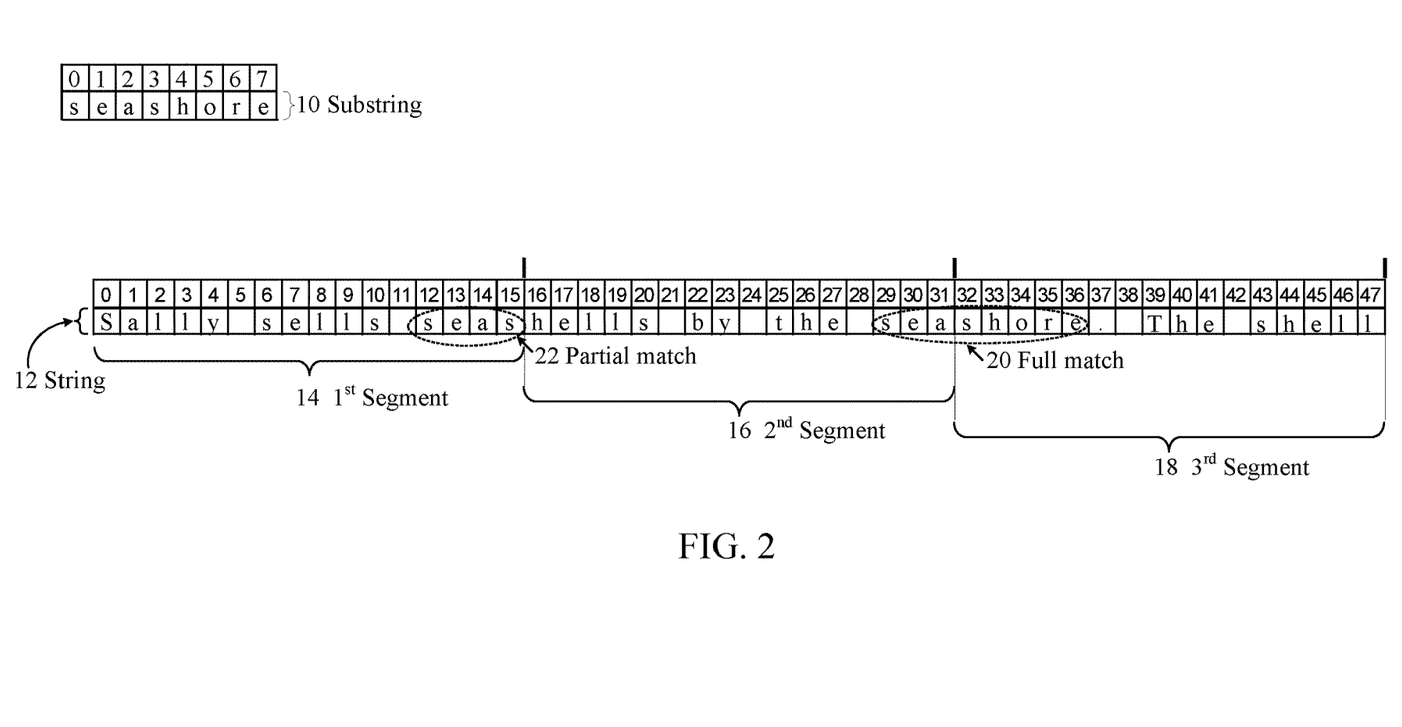
FIG. 2 depicts the results of a retrace-less substring search resulting from the use of carry logic applied to different segments of a string, according to embodiments consistent with the figures.

According to embodiments, the string 12 is partitioned and distributed to an ordered list of segments 14, 16, 18, FIG. 2, each having an equal length that is greater than or equal to the length of the substring of data elements 10. The substring 10 is then compared sequentially with each of the segments 14, 16, 18, FIG. 2, in the order of the list, to detect a match within the segments 14, 16, 18. Segments 14, 16, 18 are further depicted in FIG. 2.

The method can include detecting a partial match, for example, 22. The method can also include detecting a full match, for example, 20, (see FIG. 2), between the substring 10 and a segments 14, 16, 18, in response to detecting a partial match 22 in one of the segments. A carry vector 36 can be created by including a partial match, for example, 22 of the substring 10, and when comparing the substring 10 with the segments 14, 16, 18, it can be determined that a carry vector 36 exists. If a carry vector 36 exists, the method can include determining if a full match 20 between the carry vector 36 and one or more of the segments 14, 16, 18 exists. If a carry vector 36 exists, the carry vector 36 is propagated to a next iteration for determining if a full match 20 exists between the substring 10 and the ordered list of segments 14, 16, 18. In some embodiments, the substrings 10 can be compared with each segment 14, 16 sequentially, but in some embodiments, compare operations within a segment 14, 16, 18 can be executed in parallel, which can be useful in increasing substring searching speed.

According to embodiments, detecting a substring 10 within a string 12 can be performed by a bitwise compare operation of the substring 10 and the string 12. For this purpose, trailing zeros of the substring 10 may overwrite the respective comparison results with a value of one for a comparison with the string 12.

The structure illustrated in FIG. 1 has an additional carry logic for continuation of the diagonal AND chains into the next iteration. The equality compare matrix is split in two parts: the upper diagonal's AND chains and the lower diagonal's AND chains. The upper diagonal's AND chains can be used to perform the substring search within the current segment, and the lower diagonal's AND chains can be used to continue the substring search from the previous segment in order to capture substrings that start in the previous segment and end in the current segment.

For ease of illustration, FIG. 1 shows vector sizes of 8 characters, however larger vector sizes, e.g., 16, 32, 64 characters and above, are also possible. The carry vector c 36 is the anticipated intermediate result S, the first result bitmask 30, of the previous segment. There are different possible ways to generate this vector. According to embodiments, one option is can be to store the vector in an internal register of the vector engine, however this may cause conflicts in out-of-order instruction execution. Another option can be to provide the vector as a third operand. There can be two result vectors: r, which is a second result bitmask 32 that indicates full matches within the current segment, and r', which is a third result bitmask 34 that indicates matches that start in the previous segment and end in the current segment.

Embodiments of the present disclosure can thus further include determining a first result bitmask 30 that indicates at least one intermediate anticipated partial match 22 or a full match 20 for the current segment 14, 16 or 18, determining a second result bitmask 32 that indicates at least one full match 20 for the current segment 14, 16 or 18, and determining a third result bitmask 34 that indicates at least one partial match 22 that starts in a previous segment, e.g., 14, 16 or 18 and ends in the current segment, e.g., 14, 16 or 18.

The first result bitmask 30 for a previous segment, e.g., 14, 16, 18 may be propagated to a carry vector 36 for the current segment 14, 16, 18. Hereby the first result bitmask 30 can be reversed in bit order for propagating to the carry vector 36.

The first result bitmask 30 may be determined by applying linked logical AND operations in upper diagonals of the comparator matrix 100 to compare operations of the substring 10 and the string 12, whereas the third result 34 may be determined by applying linked logical AND operations in lower diagonals of the comparator matrix 100 to compare operations of the carry vector 36 and the string 12. The logical AND operations may be linked logical AND operations in hardware solutions, as operations implemented in hardware may be executed in parallel. Further, despite the fact that in the matrix shown in FIG. 1 the operations are depicted as a chain, a logic synthesis operation may create a tree structure for implementing a parallel solution, which can result in a shorter critical path. The second result bitmask 32 can be determined by applying a correction mask cm 40 by a logical AND operation to the first result bitmask 30.

The first result bitmask 30 may be corrected by suppression of the partial matches 22 by the correction mask 40. The correction mask 40 may invalidate a number of trailing result bits of the first result bitmask 30, wherein the number is equal to the length of the substring 10 minus one. If, for example, the substring 10 has a length of L=4 bits, then a real full match might occur in the fourth trailing bit, but not from the third trailing bit onward. In this case the trailing three bits, equal to L−1, would be invalidated.

According to embodiments, the comparator matrix 100 can be implemented in a hardware device such as an integrated circuit (IC). Thus, a dedicated logic device 200 may be used for detecting substrings 10 within a string 12 of data elements, e.g., characters. The logic device 200 may include at least a comparator matrix 100 with diagonal AND chains for substring match and correction logic to suppress partial matches, an input register for the substring 10, an input register for the string 12, an output register for a first result bitmask 30, an output register for a second result bitmask 32, an output register for a third result bitmask 34; and an input/output register for a carry vector 36, for performing the proposed method.

FIG. 2 depicts a retrace-less substring search resulting from carry logic in different segments of a string 12, according to embodiments. According to embodiments, the example in FIG. 2 shows that the method does not require retracing. Thus the forward movement in detecting a substring 10 within a string 12 of data elements can be more rapid than other types of substring searching techniques.

FIG. 2 depicts a substring 10 consisting of 8 characters as well as a string 12 consisting of 48 characters, by way of example. A search in the first segment 14 can deliver a partial match 22, for example, "seas," whereas a further search in the second segment 16 and the third segment 18 can deliver a full match 20, for example, "seashore" on the transition from the second segment 16 to the third segment 18. It can be understood that the examples provided herein are not to be construed as limiting. It can be also understood that partial matches can include one or more characters included in the substring 10, and that full matches include the complete ordered set of characters, e.g., "seashore" that is found in both the substring 10 and one or more of the ordered list of segments 14, 16 and 18.

Figure 3:
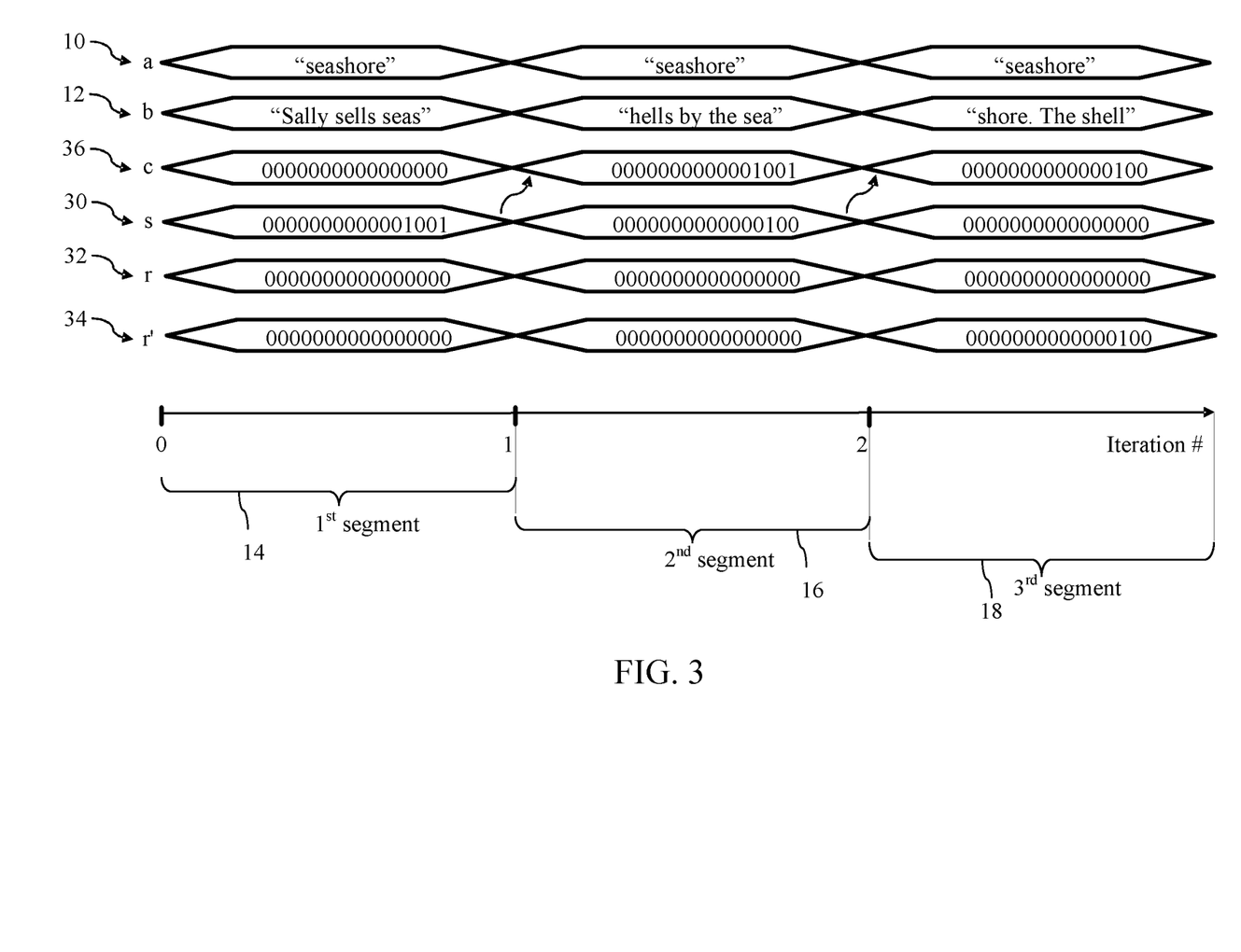
FIG. 3 depicts the contents of the various segments of the string depicted in FIG. 2 together with corresponding result bitmasks and carry vectors, according to embodiments consistent with the figures.

FIG. 3 depicts the contents of the different segments 14, 16, 18 of the string 12 as shown in FIG. 2, together with the corresponding result bitmasks 30, 32, 34 and the carry vector 36, according to embodiments. The first result bitmask 30 of the substring search in the first segment 14 is propagated as a carry vector 36 to the second segment 16. The first result bitmask 30 of the substring search in the second segment 16 is propagated as a carry vector 36 to the third segment 18.

Figure 4:
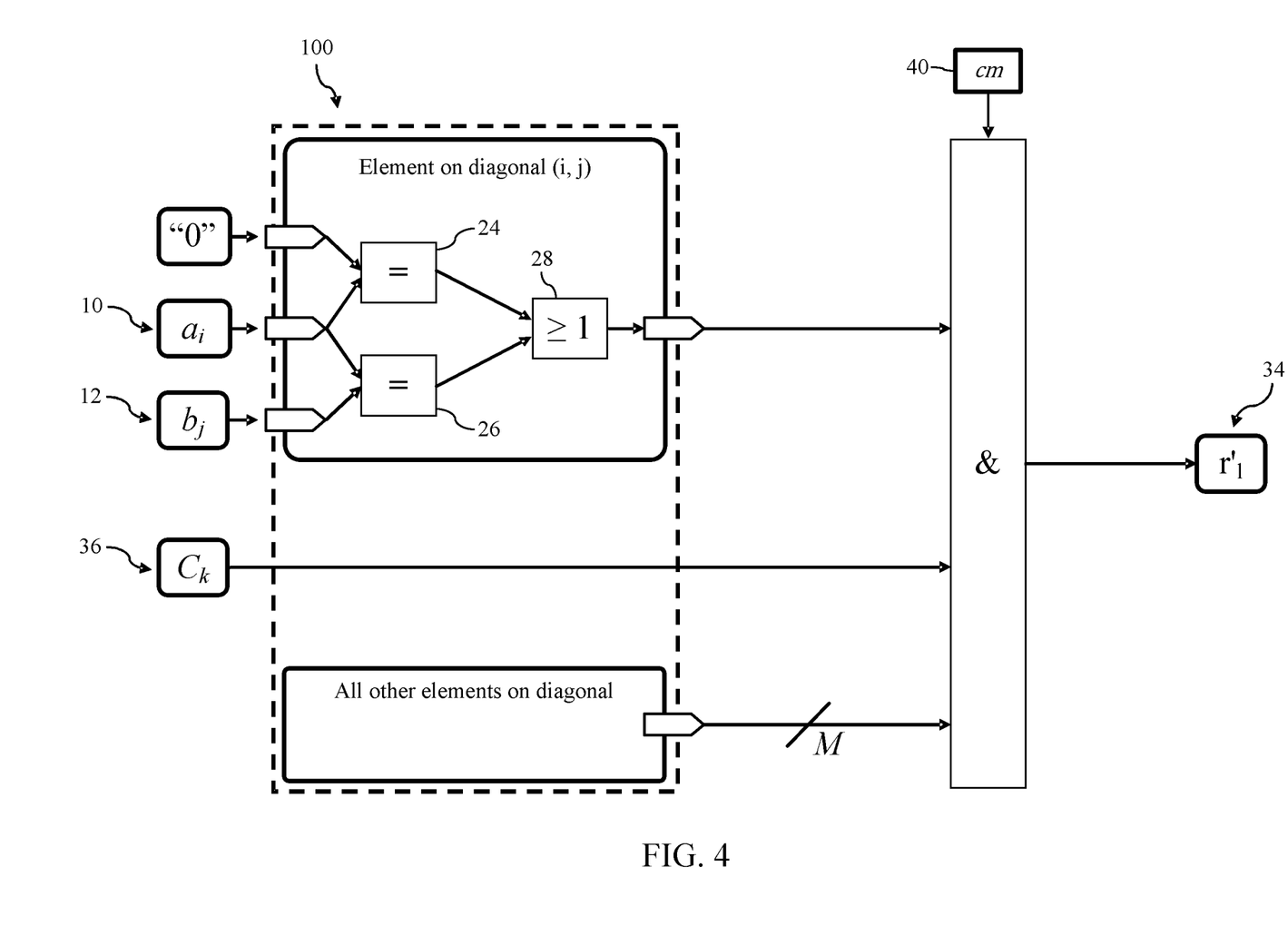
FIG. 4 depicts the extension of the comparator matrix by using the input of the carry vector, according to embodiments consistent with the figures.

FIG. 4 depicts the extension of the comparator matrix 100 by using the input of the carry vector 36, according to embodiments. First a substring element $a_i$ 10 on a diagonal (i, j) of the comparator matrix 100 is checked for zero by an equality comparator 24. If this is the case, a value of one is delivered to a comparator 28, implemented as a logical OR gate. The substring element $a_i$ 10 and the string element $b_j$ 12 is checked for equality by the comparator 26 and the result is delivered to the OR gate 28, which checks if the sum of both values is greater or equal to one. The result of this compare operation is delivered to the correction mask 40, together with a possible carry vector element $c_k$ 36. All other elements on a diagonal of the comparator matrix 100 are delivered to the correction mask 40 with a width of M, the length of the segment 14, 16, 18, which is depicted as equal to the length of the substring 10. After application of the correction mask 40 by a logical AND operation, the third result bitmask 34 results in an element $r'_l$.

Figure 5:
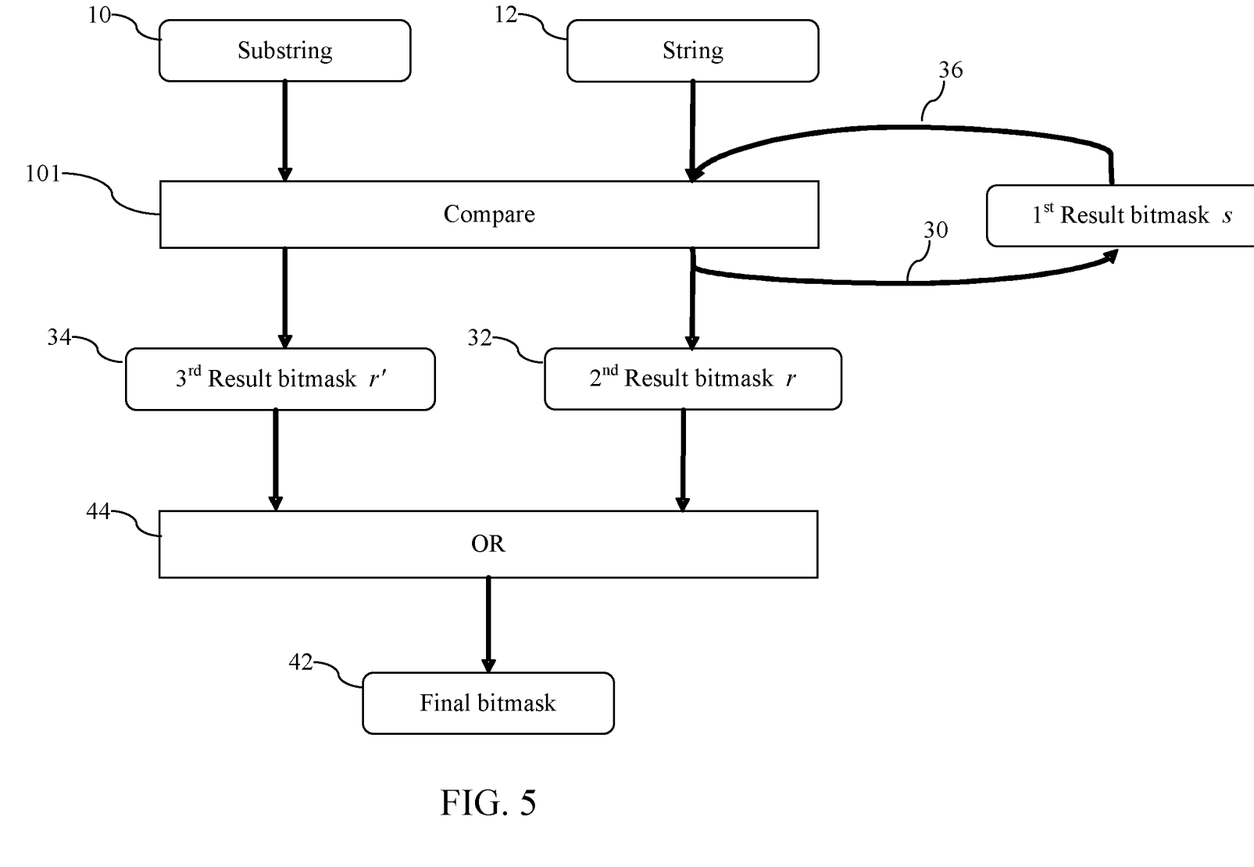
FIG. 5 depicts a flow diagram depicting a method for detecting substrings within a string of data elements, according to embodiments consistent with the figures.

FIG. 5 depicts a flow diagram depicting a method for detecting substrings 10 within a string 12 of data elements, according to embodiments. Substring 10 and string 12 each represent inputs of the comparator matrix 100. The compare operation 101 delivers a first result bitmask 30, a second result bitmask 32 and a third result bitmask 34, in one iteration of the substring search. The first result bitmask 30, that indicates a partial match of the substring 10, may be propagated as a carry vector 36 back to the comparator matrix 100 for use in a subsequent iteration. Second result bitmask 32 and third result bitmask 34 are combined in an OR operation 44 in order to deliver a final bitmask 42 as a final result of the substring search.

Another embodiment may include returning the index of the first occurrence of a substring. For instance the C programming language library function "strstr" returns either the pointer to the first occurrence or a null pointer if there was no match at all. The proposed vector engine can facilitate this by deriving a return index based on the following equation:

$$\text{match\_index} = \begin{cases} 0 - \text{trailing\_zeros}(r') - 1, & \text{for } r' \neq 0 \\ \text{leading\_zeros}(r), & \text{for } r' = 0, r \neq 0 \\ M, & \text{for } r' = 0, r = 0 \end{cases}$$

If there is a substring that starts in the previous segment and ends in the current segment, then a negative index is returned based on the trailing zeros of the third result bitmask r'. If there is only a substring in the current segment, then the leading zeros of the second result bitmask r are returned. In case there is neither a match in the previous segment nor in the current segment, then the vector length M is returned. This can be used by software as indicated in the following pseudo-code to calculate the return pointer for long target strings spanning multiple segments of the size M:

```
Const M = 16
Int frag
Int match_index
Char *ptr_a, *ptr_b
Int *ptr_c
Int carry
carry = 0
frag = 0
ptr_a = REFSTRING_BASE
ptr_b = TARGETSTRING_BASE
ptr_c = &carry
while(*ptr_b != 0)--string not empty, i.e., end not reached yet
{
    match_index = csubstr(&ptr_a, &ptr_b, &ptr_c)
    if match_index < M
    {
        return &ptr_b + match_index
    }
    ptr_b = ptr_b + M--forward movement by M characters
}
return NULL--substring not found
```

Thereby, csubstr is a function utilizing a hardware vector engine to return a match_index as specified by the equation above. Ptr_a and ptr_b are the pointers to the substring 10 and the target string 12 respectively. Ptr_c is a pointer to the carry variable which is loaded in the carry vector c 36, and will be overwritten with the intermediate anticipated result S, in reversed bit-order, as a first result bitmask 30 of the current segment before a new iteration starts. The pseudo-code above requires only a minimalistic set of conditional branches: (1) the condition in the while-loop to stop when the end of the string 12 is reached and (2) the if-statement that checks whether there was a match, which is indicated by a match_index<M.

Alternatively, replacing these checks by interrupt signals, e.g., driven by zero detect on the string 12 and OR trees on the bits of r' and r, could possibly completely eliminate conditional branches. The iterations could be controlled by a linear for-loop that can be interrupted as soon as a match is found or the end of the string 12 is reached.

Figure 6:
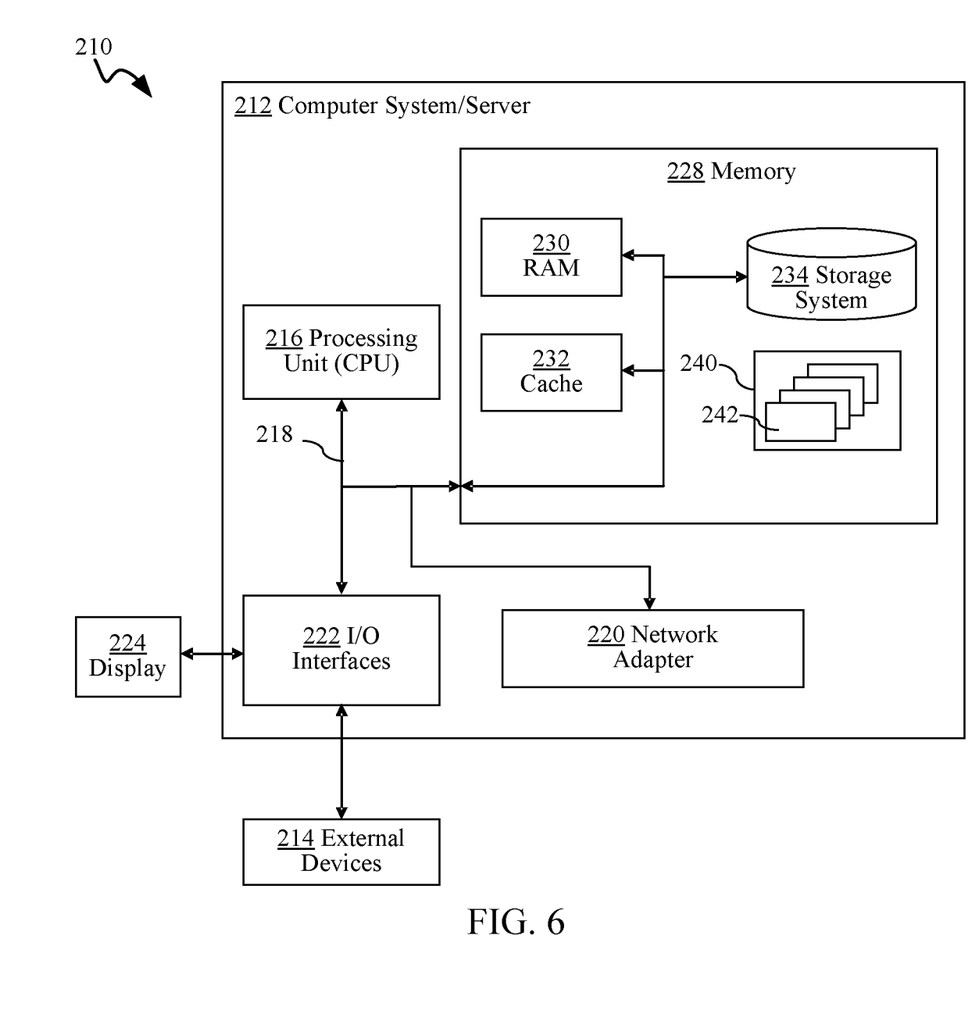
FIG. 6 depicts an example data processing system that can be used to execute the method depicted in FIG. 5, according to embodiments consistent with the figures.

Referring now to FIG. 6, a schematic of an example of a data processing system 210 is shown. Data processing system 210 is only one example of a suitable data processing system and is not intended to suggest any limitation as to the scope of use or functionality of embodiments described herein. Regardless, data processing system 210 is capable of being implemented and/or performing any of the functionality set forth herein above.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. A non-limiting list of such architectures can include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer-readable media. Such media may be any available media that is accessible by computer system/server 212, and can include both volatile and non-volatile media, removable and non-removable media.

System memory 228 can include non-transitory computer-readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set, e.g., at least one, of program modules that are configured to carry out the functions of embodiments.

Program/utility 240, having a set of at least one program module(s) 242, may be stored in memory 228 by way of example, and not limitation, as well as an Operating System, one or more application programs, other program modules, and program data. Each of the Operating System, one or more application programs, other program modules, and program data or some combination thereof, may include an implementation of a networking environment. Program modules 242 generally carry out the functions and/or methodologies of embodiments as described herein.

Computer system/server 212 may also communicate with one or more external devices 214 such as a keyboard, a pointing device, a display 224, etc.; one or more devices that enable a user to interact with computer system/server 212; and/or any devices, e.g., network card, modem, etc., that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, redundant array of independent disks (RAID) systems, tape drives, and data archival storage systems, etc.

The present invention may be a system, a method, and/or a computer program product. The computer program product may include a non-transitory computer-readable storage medium or media having computer-readable program instructions thereon for causing a processor to carry out aspects of the present invention.

The computer-readable storage medium can be a tangible device that can retain and store instructions for use by an instruction execution device. The computer-readable storage medium may include, for example, but is not limited to, an electronic storage device, a magnetic storage device, an optical storage device, an electromagnetic storage device, a semiconductor storage device, or any suitable combination of the above. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention. In some embodiments, electronic circuitry used in the fabrication of a logic device to implement aspects of the present disclosure can include application-specific integrated circuits (ASICs) such as gate-array chips, or other types of custom or semi-custom integrated circuits (ICs). Such ICs can be fabricated using IC technologies and associated design styles such as complementary metal-oxide semiconductor (CMOS) and silicon on insulator (SOI).

Aspects of the present invention are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting, with a logic device, a substring of data elements within a string of data elements stored within a data storage device, the method comprising:
partitioning and distributing, with the logic device, the string of data elements to an ordered list of segments, the segments each having equal lengths that are at least equal to a length of the substring of data elements;
detecting, with a comparator matrix of the logic device, by sequentially comparing the substring of data elements with each segment of the ordered list of segments, a substring match within a segment of the ordered list of segments wherein the substring match includes a consistently ordered set of at least one data element, the consistently ordered set existing in both the string of data elements and the substring of data elements;
creating, with the logic device, in response to detecting the substring match that is a partial match, a carry vector that includes the substring match, wherein the partial match includes a consistently ordered set of at least one data element that has a length less than a length of the substring of data elements;

determining, with the logic device, when comparing the substring with the segment of the ordered list of segments, that a carry vector exists; and determining, with the logic device, in response to the carry vector existing, that a full match exists between the carry vector and the segments of the ordered list of segments, wherein the full match includes a consistently ordered set of at least one data element that exists in both the string of data elements and the substring of data elements, and wherein the consistently ordered set of at least one data element of the full match has a length that is equal to a length of the substring of data elements.

2. The method of claim 1, further comprising propagating, in response to the carry vector existing, the carry vector to a next iteration for determining existence of a full match between the substring and the segment of the ordered list of segments.

3. The method of claim 1, further comprising:
determining a first result bitmask that indicates, for a current segment, a match selected from the group consisting of: an intermediate anticipated partial match, and a full match;
determining a second result bitmask that indicates a full match for the current segment; and
determining a third result bitmask that indicates a partial match that starts in a previous segment and ends in the current segment.

4. The method of claim 3, further comprising propagating a first result bitmask for a previous segment to a carry vector for the current segment.

5. The method of claim 3, wherein the first result bitmask has a reversed bit order for propagating to the carry vector.

6. The method of claim 3, wherein the first result bitmask is determined by applying linked logical AND operations in diagonals of a comparator matrix to compare operations of the substring and the string.

7. The method of claim 3, wherein the third result bitmask is determined by applying linked logical AND operations in diagonals of a comparator matrix to compare operations of the carry vector and the string.

8. The method of claim 3, further comprising determining, by applying a logical OR operation to the second result bitmask and the third result bitmask, a final bitmask for detecting the substring within the string.

9. The method of claim 3, further comprising determining an index for the first occurrence of a substring within a string, the determining including:
returning, in response to the substring that starts in a previous segment and that ends in the current segment, a negative index based on trailing zeroes of the third result bitmask;
returning, in response to the substring occurring in the current segment, a number of leading zeroes of the second result bitmask; and
returning a length of the segment.

10. The method of claim 3, wherein the first result bitmask is corrected by a correction mask that suppresses partial matches.

11. The method of claim 10, further comprising invalidating, with the correction mask, a number of trailing result bits of the first result bitmask, wherein the number is equal to the length of the substring minus one.

12. The method of claim 10, wherein the second result bitmask is determined by applying the correction mask by a logical AND operation to the first result bitmask.

13. The method of claim 1, further comprising detecting, by a bitwise compare operation of the substring and a string, a substring within the string.

14. The method of claim 1, wherein trailing zeroes of the substring overwrite the respective comparison results with a value of one for a comparison with the string.

15. The method of claim 1, wherein each data element of the string of data elements is selected from the group consisting of: a bit, a group of bits, and a character.

16. A logic device for detecting a substring of data elements within a string of data elements stored within a data storage device, the logic device comprising:
a comparator matrix including diagonal AND chains configured to detect a substring match and correction logic configured to suppress a partial match, wherein the substring match includes a consistently ordered set of at least one data element, the consistently ordered set existing in both the string of data elements and the substring of data elements and wherein the partial match includes a consistently ordered set of at least one data element that has a length less than a length of the substring of data elements;
a substring input register configured to receive and contain the substring;
a string input register configured to receive and contain the string of data elements;
a first bitmask output register configured to receive and contain a first result bitmask;
a second bitmask output register configured to receive and contain a second result bitmask;
a third bitmask output register configured to receive and contain a third result bitmask;
a carry vector input/output register configured to receive and contain a carry vector;
the logic device configured to:
partition and distribute the string of data elements, contained within the string input register, to an ordered list of segments, the segments each having equal lengths that are at least equal to a length of the substring of data elements;
detect, by sequentially comparing the substring of data elements, contained in the substring input register, with each segment of the ordered list of segments, a substring match within a segment of the ordered list of segments;
create, in response to detecting a substring match that is a partial match, a carry vector, contained in the carry vector input/output register, that includes the substring match;
determine, when comparing the substring, contained in the substring input register, with the segment of the ordered list of segments, that a carry vector exists; and
determine, in response to the carry vector existing, that a full match exists between the carry vector, contained in the carry vector input/output register, and the segment of the ordered list of segments.

17. The logic device of claim 16, further configured to propagate, in response to the carry vector existing, the carry vector to a next iteration for determining existence of a full match between the substring and the segment of the ordered list of segments.

18. A computer program product for detecting, with a logic device, a substring of data elements within a string of data elements stored within a data storage device, the computer program product comprising a computer-readable storage medium having program instructions embodied therewith, wherein the computer-readable storage medium does not comprise a transitory signal per se, the program instructions executable by a computer to cause the computer to perform a method comprising:
- partitioning and distributing, with the logic device, the string of data elements to an ordered list of segments, the segments each having equal lengths that are at least equal to a length of the substring of data elements;
- detecting, with a comparator matrix of the logic device, by sequentially comparing the substring of data elements with each segment of the ordered list of segments, a substring match within a segment of the ordered list of segments wherein the substring match includes a consistently ordered set of at least one data element, the consistently ordered set existing in both the string of data elements and the substring of data elements;
- creating, with the logic device, in response to detecting a substring match that is a partial match, a carry vector that includes the substring match, wherein the partial match includes a consistently ordered set of at least one data element that has a length less than a length of the substring of data elements;
- determining, with the logic device, when comparing the substring with the segment of the ordered list of segments, that a carry vector exists; and
- determining, with the logic device, in response to the carry vector existing, that a full match exists between the carry vector and the segment of the ordered list of segments, wherein the full match includes a consistently ordered set of at least one data element that exists in both the string of data elements and the substring of data elements, and wherein the consistently ordered set of at least one data element of the full match has a length that is equal to a length of the substring of data elements.

19. The computer program product of claim 18, wherein the method further comprises propagating, in response to the carry vector existing, the carry vector to a next iteration for determining existence of a full match between the substring and the segment of the ordered list of segments.

20. The computer program product of claim 18, wherein the method further comprises:
- determining a first result bitmask that indicates, for a current segment, a match selected from the group consisting of: an intermediate anticipated partial match, and a full match;
- determining a second result bitmask that indicates a full match for the current segment; and
- determining a third result bitmask that indicates a partial match that starts in a previous segment and ends in the current segment.

* * * * *